US007724634B2

United States Patent
Kurogama et al.

(10) Patent No.: US 7,724,634 B2
(45) Date of Patent: May 25, 2010

(54) OPTICAL PICKUP APPARATUS WITH TEMPERATURE COMPENSATION

(75) Inventors: Tatsuji Kurogama, Hachioji (JP); Kiyono Ikenaka, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 622 days.

(21) Appl. No.: 11/657,089

(22) Filed: Jan. 24, 2007

(65) Prior Publication Data

US 2007/0177483 A1   Aug. 2, 2007

(30) Foreign Application Priority Data

Jan. 27, 2006   (JP)   ............... 2006-018659

(51) Int. Cl.
*G11B 7/00*   (2006.01)
(52) U.S. Cl. ............... 369/112.05; 369/53.26; 369/121
(58) Field of Classification Search ............... None
See application file for complete search history.

(56) References Cited

U.S. PATENT DOCUMENTS

| 6,552,974 | B1 * | 4/2003 | Kim | ............... 369/44.37 |
| 2004/0090893 | A1 * | 5/2004 | Ootera | ............... 369/53.19 |
| 2004/0208109 | A1 * | 10/2004 | Jung et al. | ............... 369/112.03 |
| 2005/0111516 | A1 * | 5/2005 | Hatano et al. | ............... 372/106 |
| 2005/0122861 | A1 * | 6/2005 | Park et al. | ............... 369/44.37 |
| 2005/0135220 | A1 * | 6/2005 | Katayama | ............... 369/112.16 |
| 2005/0185539 | A1 * | 8/2005 | Shimano et al. | ............... 369/44.37 |
| 2008/0031103 | A1 * | 2/2008 | Horinouchi et al. | ............... 369/44.37 |
| 2008/0031121 | A1 * | 2/2008 | Katayama et al. | ............... 369/112.29 |

FOREIGN PATENT DOCUMENTS

JP   2004-171709   6/2004

* cited by examiner

*Primary Examiner*—Paul Huber
(74) *Attorney, Agent, or Firm*—Finnegan, Henderson, Farabow, Garrett & Dunner, L.L.P.

(57) ABSTRACT

An optical pickup apparatus, comprising: a light source to emit a light flux; a light converging system including an objective lens to converge the light flux emitted from said light source onto an optical information recording medium; a first diffraction element placed within an optical path up to the optical information recording medium; a light flux splitting element that is placed within the optical path from said light source up to the optical information recording medium and that splits an incident light flux emitted by the light source; a monitor element that receives a light flux split by said light flux splitting element and outputs a signal according to a received light amount; a second diffraction element placed between said light flux splitting element and said monitor element; and a control section that controls the drive of said light source according to the signal from said monitor element.

22 Claims, 6 Drawing Sheets

OPTICAL PICKUP APPARATUS WITH TEMPERATURE COMPENSATION

This application is based on Japanese Patent Application No. 2006-18659 filed on Jan. 27, 2006 in Japanese Patent Office, the entire content of which is hereby incorporated by reference.

FIELD OF THE INVENTION

The present invention relates to optical pickup apparatuses, and in particular, to optical pickup apparatuses that can record and/or reproduce of information that can be mutually compatible with different of optical disks.

BACKGROUND OF THE INVENTION

In recent years, the research and development of high density optical disk systems that can carry out recording/reproduction of information using blue-violet color semiconductor laser of wavelengths with about 400 nm has been progressing rapidly. As one example, in an optical disk carrying out information recording and reproduction with the specifications of an NA of 0.85, and light source wavelength with 405 nm, that is, in a so-called Blu-ray Disc (BD), for an optical disk of 12 cm diameter which is the same size as that of a DVD (NA of 0.6, light source wavelength with 650 nm), it is possible to record 20 to 30 GB of information per side, and further, in an optical disk carrying out information recording and reproduction with the specifications of an NA of 0.65, and light source wavelength with 405 nm, that is, in a so-called HD DVD, for an optical disk of 12 cm diameter, it is possible to record 15 to 20 GB of information per side. In the following, in the present patent description, these types of optical disks are called "High density DVDs".

However, it cannot be said that the value as a product of the optical pickup apparatus is sufficient when merely appropriate information can be recorded and reproduced in a high density DVD of the above types. At present, considering the current reality that DVDs and CDs with various types of information recorded in them are being sold, it is not sufficient to record and reproduce appropriate information in high density DVDs, and, for example, the ability to record and reproduce appropriate information in a similar manner in the conventional DVDs or CDs possessed by the user leads to increasing the value of the product as a compatible type of optical pickup apparatus. Because of this background, the optical system used in a compatible type optical pickup apparatus, of course must be low in cost and have a simple configuration, and in addition, it is desirable that it should be possible to obtain a good spot size for recording and reproducing appropriate information in high density DVDs, and conventional DVDs and CDs also. Further, although optical pickup apparatuses have been realized that can record and/or reproduce information in a compatible manner for DVDs and CDs, there is the current situation that further size reduction, thickness reduction, and cost reduction on the current configuration are being desired.

However, in order to realize an optical pickup apparatus having compatibility with DVDs and CDs, objective lenses provided with diffraction structures have been developed. As such an objective lens, for example, there is one in which, on one surface of the objective lens, different diffraction structures are provided inside and outside a prescribed distance h from the optical axis in a direction perpendicular to the optical axis, in the inner region, spherical aberration is corrected for the different protective substrate thicknesses, and in the outer region, spherical aberration is corrected only at the time of using a DVD but flaring is done without correcting the spherical aberration at the time of using a CD. By forming an objective lens of this type, it becomes possible to form appropriate focusing spots required at the time of recording or reproducing the respective information in the different optical information recording media (see Patent Document 1).

Patent Document 1: Unexamined Japanese Patent Application Publication No. 2004-171709.

It is also possible to form this type of diffraction structure, not limited to on the objective lens, but on the collimator lens or coupling lens, or in a dedicated optical element. In addition, on the one hand, in order to absorb the aberration error (color aberration) due to variations in the wavelength of the laser light source or wavelength fluctuations, there are cases in which a diffraction element is provided, of course, in the light emission system from the light source to the optical disk.

However, when a diffraction element is provided in the light emission system as in these examples, there was the problem that, because of variations in the diffraction efficiency, there were variations in the amount of light focused on the information recording surface of the optical disk. In other words, the temperature of the diffraction element changes along with changes in the ambient temperature, the diffraction efficiency of the diffraction element used in the light emission system changes, or else the temperature of the light source changes or the amount of light emitted changes, the wavelength of the emitted light changes, and as a result, very often the diffraction efficiency of that diffraction element changes.

FIG. 5 is a simulation diagram showing the state of the spot of light focused on the recording surface of an optical disk and the flare, and in this case, the focused light spot SPT is at the center point, and surrounding it is the flare. The flare shown here is generated when the temperature of the diffraction element DE formed on the optical surface of the objective lens OBJ is different from the design temperature, or when the wavelength of the light flux passing through it is different from the design wavelength. For example, if the design temperature of the diffraction element DE is 25° C. but it is used at 60° C., or if the design wavelength of that diffraction element DE is 405 nm but a light with wavelength 407 nm is incident on it, etc., a part of the light flux passing through the diffraction element DE does not form the focused light spot SPT, but becomes the flare dispersed around the focused light spot SPT. This flare is created by a diffracted light different from the design order of the diffraction element DE. In other words, although the light of different diffraction orders generated by the diffraction element DE interfere with each other and energy is given only to light of a specific order (for example, 10th order) thereby forming the focused light spot SPT by this light of a particular order, when the temperature or passing light wavelength of the diffraction element DE are different from the design conditions, the flare is generated because a part of the diffracted light of orders different from the above specific order (diffracted light of different orders) are not erased completely by diffraction. In this manner, when the temperature of the diffraction element DE or the wavelength of the light passing through it are different from the design conditions, a part of the incident light flux will not be used for the focused light spot SPT that is used for reproduction or recording of information of the optical disk, that is, a loss occurs in the amount of light.

FIG. 1(a) is a diagram showing an example of the relationship between the temperature of the diffraction element and the diffraction efficiency, and FIG. 1(b) is a diagram showing an example of the relationship between the wavelength fluctuations and the diffraction efficiency. In FIG. 1(a), while the diffraction efficiency of the optical source wavelength λH of, for example, a blue-violet laser becomes a maximum around a temperature of 25° C. of the diffraction element, the diffraction efficiency of the optical source wavelength λD of red color laser becomes a maximum around a temperature of the diffraction element of 50° C. In other words, at a temperature of the diffraction element other than the temperature at which the diffraction efficiency becomes a maximum, in the case of the light fluxes of either of the two wavelengths λH and λD, the diffraction efficiency changes in accordance with changes in the temperature. On the other hand, as is shown in FIG. 1(b), the diffraction efficiency changes even when the light source wavelength is shifted from the design wavelength.

FIG. 2(a) is a drawing showing the light flux focused on the information recording surface of the optical disk OD by the diffraction element DE as viewed in a direction at right angles to the optical axis, and FIG. 2(b) is a diagram showing the light flux focused on the information recording surface of the optical disk OD as viewed in a direction at right angles to the optical axis, and while the focused light spot SPT here has a diameter of 0.5 to 1.0μm, surrounding it is flare with a low light amount.

The diffraction efficiency when the light flux is focused on the information recording surface of the optical disk OD through the diffraction element DE of the light emission system shown in FIG. 2(a) is expressed by q/p where p is the energy of the light flux incident on the diffraction surface of the diffraction element DE and q is the energy of the light flux with a specific diffraction order in the spot SPT focused on the information recording surface of the optical disk among the light flux diffracted by that diffraction element DE. However, the diffraction order of 0 is also included.

The diffraction efficiency of the diffraction element is determined by the degree of interference between the light emitted from neighboring diffraction ring bands, and the diffraction efficiency becomes high when the interference is strong, that is, when the phase of the light is the same. In an ordinary diffraction lens, the step between the ring bands is determined assuming the oscillation wavelength of the semiconductor laser used in optical pickup apparatus and the temperature of the diffraction element, so that the phase is the same in those conditions.

However, in actuality, the oscillation wavelength of the semiconductor laser differs depending on the individual laser, or the wavelength of oscillations changes or the diffraction element itself expands or contracts due to changes in the environmental temperature. As a result, because the phase of the light emitted from neighboring ring bands gets shifted, and because the diffraction efficiency changes as is shown in FIG. 1, the amount of light of the light flux with the order of diffraction focused on the recording surface of the optical disk changes.

Since the amount of shift in the phase becomes large as the step between the ring bands designed originally becomes large, particularly in a diffraction structure using diffracted light of a high order of diffraction, the diffraction efficiency changes sensitively with respect to changes in the wavelength and temperature.

For example, when the amount of light in the emitted light from a semiconductor laser changes, because of the so called APC (Auto Power Control) drive control, by guiding a part of the light flux emitted from the semiconductor laser to a monitor element, the amount of emitted light is monitored accurately, and based on the result of that monitoring, it is possible to stabilize the amount of light emitted by the semiconductor laser. However, when the diffraction efficiency changes, since this is not reflected in the result of monitoring, light flux with changed amount of light gets focused as it is on the information recording surface of the optical disk. In that case, if the amount of light focused on the recording surface of the optical disk fluctuates, it is likely that a problem occurs such as either it becoming difficult to carry out good reading of the recorded information or it being not possible to carry out good recording.

In an example of an optical pickup apparatus shown in FIG. 6, the signal from the temperature detector TD that measures the environmental temperature of the optical pickup apparatus is input to the first Auto Power Control APC1 and the second Auto Power Control APC2. When the environmental temperature changes with respect to the set value, based on the graph in FIG. 1(a), the first Auto Power Control APC1 or the second Auto Power Control APC2 carries out laser control in the direction of compensating the change in the diffraction efficiency (for example, increasing the laser power if the diffraction efficiency decreases, or decreasing the laser power if the diffraction efficiency increases). However, it is desirable to place the temperature detector TD in the neighborhood of the actuator of the objective lens OBJ, inside the optical housing, or in its neighborhood.

In this manner, it is also possible to think of, for example, measuring using a thermistor, etc., the environmental temperature or the temperature of the diffraction element of the optical pickup apparatus or in its surroundings, and to change the output of the semiconductor laser in accordance with the result of that measurement. In the example of an optical pickup apparatus shown in FIG. 6, although there is the advantage that it is possible to correct the changes in the diffraction efficiency due to changes in the temperature with a relatively simple and inexpensive configuration, as has been explained above, changes in the diffraction efficiency occur not only due to changes in the environmental temperature but also due to changes in the wavelength of oscillations of the light source, even if only changes in the environmental temperature are measured, it is difficult to adjust the output of the semiconductor laser accurately based on that.

SUMMARY OF THE INVENTION

The present invention was made in view of the problems in the conventional technology, and the purpose of the present invention is to provide an optical pickup apparatus that, while having a relatively simple configuration, can carry out appropriate information recording and/or reproduction irrespective of changes in the environmental temperature or the light source wavelength.

According to the first aspect of the present invention there is provided an optical pickup apparatus comprising a first light source to emit a light flux with a first wavelength λH; a light converging system including an objective lens to converge the light flux emitted from said first light source onto an information recording surface of an optical information recording medium through a protective substrate of the optical information recording medium, wherein a thickness of the protective substrate is t1; a first diffraction element placed within an optical path from said first light source up to the optical information recording medium; a light flux splitting element that is placed within the optical path from said first light source up to the optical information recording medium and that splits an incident light flux emitted by the first light source; a monitor element that receives a light flux that is split by said light flux splitting element and outputs a signal according to thea received light amount; a second diffraction element placed between said light flux splitting element and said monitor element; and a control section that controls the drive of said first light source according to the signal from said monitor element.

According to the second aspect of the present invention there is provided an optical pickup apparatus comprising a first light source to emit a light flux with a first wavelength λH; a second light source to emit a light flux with a second wavelength λD (λH<λD); a light converging system including an objective lens to converge the light flux emitted from said first light source through a protective substrate having a thickness of t1 onto an information recording surface of a first optical information recording medium, and to converge the light flux emitted from said second light source through a protective substrate having a thickness of t2 (t1≦t2) onto an information recording surface of a second optical information recording medium; a first diffraction element placed within an optical path from at least one of said first light source and said second light source to one of the first optical information recording medium and the second optical information recording medium; an light flux splitting element that is placed within the optical path from said first light source up to said optical information recording medium and that splits the incident light flux; a monitor element that receives the light flux that is split by said light flux splitting element and outputs a signal according to the received light amount; a second diffraction element placed between said light flux splitting element and said monitor element; and a control section that controls the drive of said first light source according to the signal from said monitor element.

According to the present invention, since the light flux passing through said second diffraction element is incident on said monitor element, when a temperature change occurs, or when there is a wavelength fluctuation in the light source, a change similar to the change in the diffraction efficiency that occurs in the light flux passing through said first diffraction element occurs in the light flux passing through said second diffraction element. Therefore, when the amount of light of the focused light spot at the information recording surface of the optical information recording medium decreases, since the amount of light of the light flux received by said monitor element also decreases, it is possible for said control section to increase the output of said first light source or of said second light source in accordance with that, or else, if the amount of light of the focused light spot at the information recording surface of the optical information recording medium increases, since the amount of light of the light flux received by said monitor element also increases, it is possible for said control section to decrease the output of said first light source or of said second light source in accordance with that, and because of this it is possible to compensate for changes in the amount of light of the focused light spot at the information recording surface of the optical information recording medium and to adjust the amount of light to that appropriate for recording and/or reproduction of information.

According to the optical pickup apparatus of the third aspect of the present invention, there is provided an optical pickup apparatus of the first aspect, wherein a diffraction structure of said first diffraction element and a diffraction structure of said second diffraction element are formed in such a manner that, when a change occurs in the environmental temperature change, if the diffraction efficiency of the light flux passing through the diffraction structure of said first diffraction element increases, the diffraction efficiency of the light flux passing through the diffraction structure of said second diffraction element increases, and if the diffraction efficiency of the light flux passing through the diffraction structure of said first diffraction element decreases, the diffraction efficiency of the light flux passing through the diffraction structure of said second diffraction element decreases.

According to the optical pickup apparatus of the fourth aspect of the present invention, there is provided an optical pickup apparatus of the first aspect, wherein a diffraction structure of said first diffraction element and a diffraction structure of said second diffraction element are formed in such a manner that, when a fluctuation occurs in the wavelength of the light flux emitted from said first the light source, if the diffraction efficiency of the light flux passing through the diffraction structure of said first diffraction element increases, the diffraction efficiency of the light flux passing through the diffraction structure of said second diffraction element increases, and if the diffraction efficiency of the light flux passing through the diffraction structure of said first diffraction element decreases, the diffraction efficiency of the light flux passing through the diffraction structure of said second diffraction element decreases.

According to the optical pickup apparatus of the fifth aspect of the present invention, there is provided an optical pickup apparatus of the first aspect, wherein each step difference in a direction of an optical axis of a diffraction structure of said first diffraction element is almost equal to each step difference in the direction of an optical axis of a diffraction structure of said second diffraction element.

Even if an error such as a deviation relative to the ideal shape of the diffraction shape of the diffraction element due to technical difficulties in the formation of fine structures, if the depth of the step (the diffraction groove) is almost identical, even the amount of change in the diffraction efficiency becomes almost equal. Further, since the amount of shift in the amount of phase difference generated at neighboring ring bands is identical when the temperature or the wavelength deviates from the design conditions, even the amount of change of the diffraction efficiency is identical when there is a change in the temperature or wavelength.

According to the optical pickup apparatus of the sixth aspect of the present invention, there is provided an optical pickup apparatus of the first aspect, wherein a diffraction structure of said first diffraction element comprises a plurality of ring-shaped zone steps and a diffraction structure of said second diffraction element comprise a plurality of ring-shaped zone steps, and wherein said first diffraction element and said second diffraction element are structured to satisfy the following equation when the light flux from said first light source passes through the diffraction structure of said first diffraction element and the diffraction structure of said second diffraction element:

$$MOD(d1 \times (n1-1)/\lambda H) = MOD(d2 \times (n2-1)/\lambda H) \qquad (1)$$

where, d1 is the step difference of the ring-shaped zone closest to an optical axis in the diffraction structure of said first diffraction element, d2 is step difference of the ring-shaped zone closest to an optical axis in the diffraction structure of said second diffraction element, n1 is a refractive index of said first diffraction element for the light flux with wavelength λH, n2 is a refractive index of said second diffraction element for the light flux with wavelength λH, and MOD (α) is an integer closest to α.

Diffraction efficiency of the diffraction structure varies due to phase difference generated between each diffraction pitch. In an optical pickup apparatus, phase difference arises when the temperature of the light source or wavelength of the light source changes. As the phase difference increases, the diffraction efficiency decreases. The extent of the phase difference depends on step difference of the diffraction structure.

Generally, the step difference is determined by a blazing wavelength at which the diffraction efficiency becomes 100%. In diffraction structures having same blazing wavelength, diffraction efficiency changes caused by change of temperature or change of wavelength become same trend. That is, when a diffraction efficiency of one diffraction structure increase, the diffraction efficiency of the other diffraction structure also increases.

Further, when the step differences of the diffraction structures are the same, it is possible to obtain same change amount of diffraction efficiency. Accordingly, it becomes possible to monitor the optical quantity of the light spot on an optical disk precisely with a monitor lens.

According to the optical pickup apparatus of the seventh aspect of the present invention, there is provided an optical pickup apparatus of the first aspect, wherein a diffraction structure of said first diffraction element comprises a plurality of ring-shaped zone steps and a diffraction structure of said second diffraction element comprise a plurality of ring-shaped zone steps, and wherein said first diffraction element and said second diffraction element are structured to satisfy the following equation when the light flux from said first light source passes through the diffraction structure of said first diffraction element and the diffraction structure of said second diffraction element:

$$MOD(dm1 \times (n1-1)/\lambda H) = MOD(dm2 \times (n2-1)/\lambda H) \quad (2)$$

where, dm1 is an average step difference of the ring-shaped zone steps of said first diffraction element within an effective radius of the diffraction structure of said first diffraction element, dm2 is an average step difference of ring-shaped zone steps of said second diffraction element within an effective radius of the diffraction structure of said second diffraction element, n1 is the refractive index of said first diffraction element for the light flux with wavelength $\lambda H$, n2 is the refractive index of the said second diffraction element for the light flux with wavelength $\lambda H$, and MOD ($\alpha$) is an integer closest to $\alpha$.

According to the optical pickup apparatus of the eighth aspect of the present invention, there is provided an optical pickup apparatus of the second aspect, wherein a diffraction structure of said first diffraction element comprises a plurality of ring-shaped zone steps and a diffraction structure of said second diffraction element comprise a plurality of ring-shaped zone steps, and wherein said first diffraction element and said second diffraction element are structured to satisfy the following equation when the light flux from said second light source passes through the diffraction structure of said first diffraction element and the diffraction structure of said second diffraction element:

$$MOD(d1' \times (n1'-1)/\lambda H) = MOD(d2' \times (n2'-1)/\lambda H) \quad (1)$$

where, d1' is the step difference of the ring-shaped zone closest to an optical axis in the diffraction structure of said first diffraction element, d2' is step difference of the ring-shaped zone closest to an optical axis in the diffraction structure of said second diffraction element, n1' is a refractive index of said first diffraction element for the light flux with wavelength $\lambda H$, n2' is a refractive index of said second diffraction element for the light flux with wavelength $\lambda H$, and MOD ($\alpha$) is an integer closest to $\alpha$.

According to the optical pickup apparatus of the ninth aspect of the present invention, there is provided an optical pickup apparatus of the second aspect, wherein a diffraction structure of said first diffraction element comprises a plurality of ring-shaped zone steps and a diffraction structure of said second diffraction element comprise a plurality of ring-shaped zone steps, and wherein said first diffraction element and said second diffraction element are structure to satisfy the following equation when the light flux from said second light source passes through the diffraction structure of said first diffraction element and the diffraction structure of said second diffraction element:

$$MOD(dm1' \times (n1'-1)/\lambda H) = MOD(dm2' \times (n2'-1)/\lambda H) \quad (2)$$

where, dm1' is an average step difference of the ring-shaped zone steps of said first diffraction element within an effective radius of the diffraction structure of said first diffraction element, dm2' is an average step difference of ring-shaped zone steps of said second diffraction element within an effective radius of the diffraction structure of said second diffraction element, n1' is the refractive index of said first diffraction element for the light flux with wavelength $\lambda H$, n2' is the refractive index of said second diffraction element for the light flux with wavelength $\lambda H$, and MOD ($\alpha$) is an integer closest to $\alpha$.

According to the optical pickup apparatus of the 10th aspect of the present invention, there is provided an optical pickup apparatus of the second aspect, wherein a diffraction structure of said first diffraction element comprises a plurality of ring-shaped zone steps and a diffraction structure of said second diffraction element comprise a plurality of ring-shaped zone steps, and wherein said first diffraction element and said second diffraction element are structured to satisfy the following equation when the light flux from said first light source and the light flux from said second light source pass through said first diffraction structure and said second diffraction structure:

$$MOD(dmm1 \times (n1-1)/\lambda H) = MOD(dmm2 \times (n2-1)/\lambda H) \quad (5)$$

where, dmm1 is an average step difference of ring-shaped zone steps of said first diffraction element within an area in which the light flux with wavelength $\lambda H$ of said first light source and the light flux with wavelength $\lambda D$ of said second light source pass through commonly, dmm2 is an average step difference of ring-shaped zone steps of said second diffraction element within an effective radius of the diffraction structure of said second diffraction element, n1 is a refractive index of said first diffraction element for the light flux with wavelength $\lambda H$, n2 is a refractive index of said second diffraction element for the light flux with wavelength $\lambda H$, and MOD ($\alpha$) is an integer closest to $\alpha$.

According to the optical pickup apparatus of the 11th aspect of the present invention, there is provided an optical pickup apparatus of the first aspect, wherein said first diffraction element and said second diffraction element are made of plastic. The refractive index of plastic has large changes with respect to temperature as compared to glass, and affects its optical characteristics. Because of this, the present invention has particular effect when the diffraction element is made of plastic. Further, by using similar plastics, since the temperature dependence of the changes in the refractive indices of said first diffractive element and said second diffractive element become almost identical, at the time of changes in the environmental temperature, the amount of light also changes following the changes in the amount of light of the spot in the monitor element. Using this, it is possible to vary the output of the light source so that the change in the amount of light in the spot becomes small. In addition, by using plastics, it is possible to manufacture the diffraction elements at a low cost.

According to the optical pickup apparatus of the 12th aspect of the present invention, there is provided an optical pickup apparatus of the first aspect, wherein said first diffraction element is said objective lens.

According to the optical pickup apparatus of the 13th aspect of the present invention, there is provided an optical pickup apparatus of the first aspect, wherein said first diffraction element is a collimator lens.

According to the optical pickup apparatus of the 14th aspect of the present invention, there is provided an optical pickup apparatus of the first aspect, wherein said first diffraction element is a color aberration compensating element.

According to the optical pickup apparatus of the 15th aspect of the present invention, there is provided an optical pickup apparatus of the second aspect, wherein said second diffraction element is a monitor lens.

According to the optical pickup apparatus of the 16th aspect of the present invention, there is provided an optical pickup apparatus of the second aspect, further comprising; a third light source to irradiate an information recording surface of a third optical information recording medium in which the thickness of a protective substrate is t3 (t2<t3) with a light flux with a third wavelength $\lambda C$ ($\lambda D<\lambda C$), wherein light fluxes of wavelengths $\lambda H$, $\lambda D$, and $\lambda C$ pass through said first diffraction element. Since compatibility has been realized using diffraction, it is possible to converge light efficiently on any optical information recording medium.

According to the optical pickup apparatus of the 17th aspect of the present invention, there is provided an optical pickup apparatus of the 16th aspect, wherein a finite light flux is incident upon said first optical element. The diffraction groove of the diffraction element used in the wavelength compatible objective lens of a finite optical system (not only the diffraction element formed on the surface of the objective lens, but also includes a diffraction element provided before the objective lens) tends to become deeper when compared to a wavelength compatible objective lens of an infinite optical system. This is because, in order to increase the diffraction efficiency in an objective lens of a finite optical system, the design has been done so that the high order diffraction light is used as the light forming the image. Because of this, there is the feature that it is easy for changes in the length of the optical path equivalent to the depth of the groove corresponding to changes in the temperature to become large. As a consequence, the present invention is particularly effective for an optical pickup apparatus having a wavelength compatible objective lens of a finite optical system. Further, it is possible to make the entire optical pickup apparatus small, when the first diffraction element causes the light flux from a light source to be incident on the information recording surface of an optical information recording medium through the objective lens without passing through a collimator or a coupling lens, using an incident finite diverging flux with light or an incident finite converging flux with light. In addition, when realizing the compatible use of different optical information recording media by making a finite light flux incident on the objective lens, it is possible to use the effect of diffraction for correcting the aberration characteristics caused by the thickness of the protective substrate being different in the different optical information recording media.

According to the optical pickup apparatus of the 18th aspect of the present invention, there is provided an optical pickup apparatus of the 16th aspect, wherein a diffraction structure of said first diffraction element comprises a plurality of ring-shaped zone steps and a diffraction structure of said second diffraction element comprise a plurality of ring-shaped zone steps, and wherein said first diffraction element and said second diffraction element are structured to satisfy the following equation:

$$MOD(dmm1 \times (n1-1)/\lambda H) = MOD(dmm2' \times (n2-1)/\lambda H) \quad (6)$$

where, dmm1' is an average step difference of ring-shaped zone steps of said first diffraction element within an area in which the light flux with wavelength $\lambda H$ of said first light source, the light flux with wavelength $\lambda D$ of said second light source and the light flux with wavelength $\lambda C$ pass through commonly, dmm2 is an average step difference of ring-shaped zone steps of said second diffraction element within an effective radius of the diffraction structure of said second diffraction element, n1 is a refractive index of said first diffraction element for the light flux with wavelength $\lambda H$, n2 is a refractive index of said second diffraction element for the light flux with wavelength $\lambda H$, and MOD ($\alpha$) is an integer closest to $\alpha$.

According to the optical pickup apparatus of the 19th aspect of the present invention, there is provided an optical pickup apparatus of the 18th aspect, wherein said first diffraction element and said second diffraction element are structured to satisfy the following equation:

$$MOD(dmm1' \times (n1-1)/\lambda H) = 6 \quad (7)$$

Since the wavelength is short in the case of blue-violet light around a wavelength of 400 nm, the changes in the diffraction efficiency due to fluctuations in the temperature or wavelength become large. In particular, the present invention is effective in a diffraction structure of converging on the information recording surface diffracted light of 5th order and above of a blue-violet light, since the depth of the step (diffraction groove) increases, and since there is a trend of the changes in the diffraction efficiency to become large.

According to the optical pickup apparatus of the 20th aspect of the present invention, there is provided an optical pickup apparatus of the 18th aspect, wherein said first diffraction element and said second diffraction element satisfy the following equation:

$$MOD(dmm1' \times (n1-1)/\lambda H) = 10 \quad (8)$$

There is the advantage that it is possible to increase the efficiency of the diffracted light even when a light flux with three different wavelengths are used by using the 10th ordered diffracted light for blue-violet color light of a wavelength around 400 nm, 6th ordered diffracted light for red color light of a wavelength around 650 nm, and 5th ordered diffracted light for near infrared light of a wavelength around 780 nm. However, in the case of this combination of ordered diffracted light, since high ordered diffracted light is used, the present invention is effective because the changes in the diffraction efficiency due to fluctuations in the temperature, wavelength, etc., becomes large due to the shape in which the diffraction grooves become deep.

According to the optical pickup apparatus of the 21st aspect of the present invention, there is provided an optical pickup apparatus of the first aspect, wherein said first diffraction element and said second diffraction element are the same. It is desirable because they will have the same diffraction characteristics.

According to the optical pickup apparatus of the 22nd aspect of the present invention, there is provided an optical pickup apparatus of the first aspect, wherein a light receiving section of said monitor element receives a part, including the optical axis, of the light incident on said monitor element. By making a size of the light flux larger than the size of the light receiving section of said monitor element to impinge on this, since it is possible to guide efficiently the light flux diverged near the peripheral part to outside the light receiving section, among the different ordered diffracted light by said second diffraction element due to temperature changes or wavelength fluctuations, it is possible to cause efficiently changes in the diffraction efficiency of said second diffraction element with respect to fluctuations in the temperature or wavelength.

According to the optical pickup apparatus of the 23rd aspect of the present invention, there is provided an optical pickup apparatus of the 16th aspect, wherein the first wavelength λH is 350 to 450 nm, the second wavelength λD is 600 to 700 nm, and the third wavelength λC is 700 to 800 nm.

According to the present invention, it is possible to provide an optical pickup apparatus that, while having a relatively simple configuration, can carry out appropriate information recording and/or reproduction irrespective of changes in the environmental temperature or the light source wavelength.

DETAILED DESCRIPTION OF THE INVENTION

Figure 3:
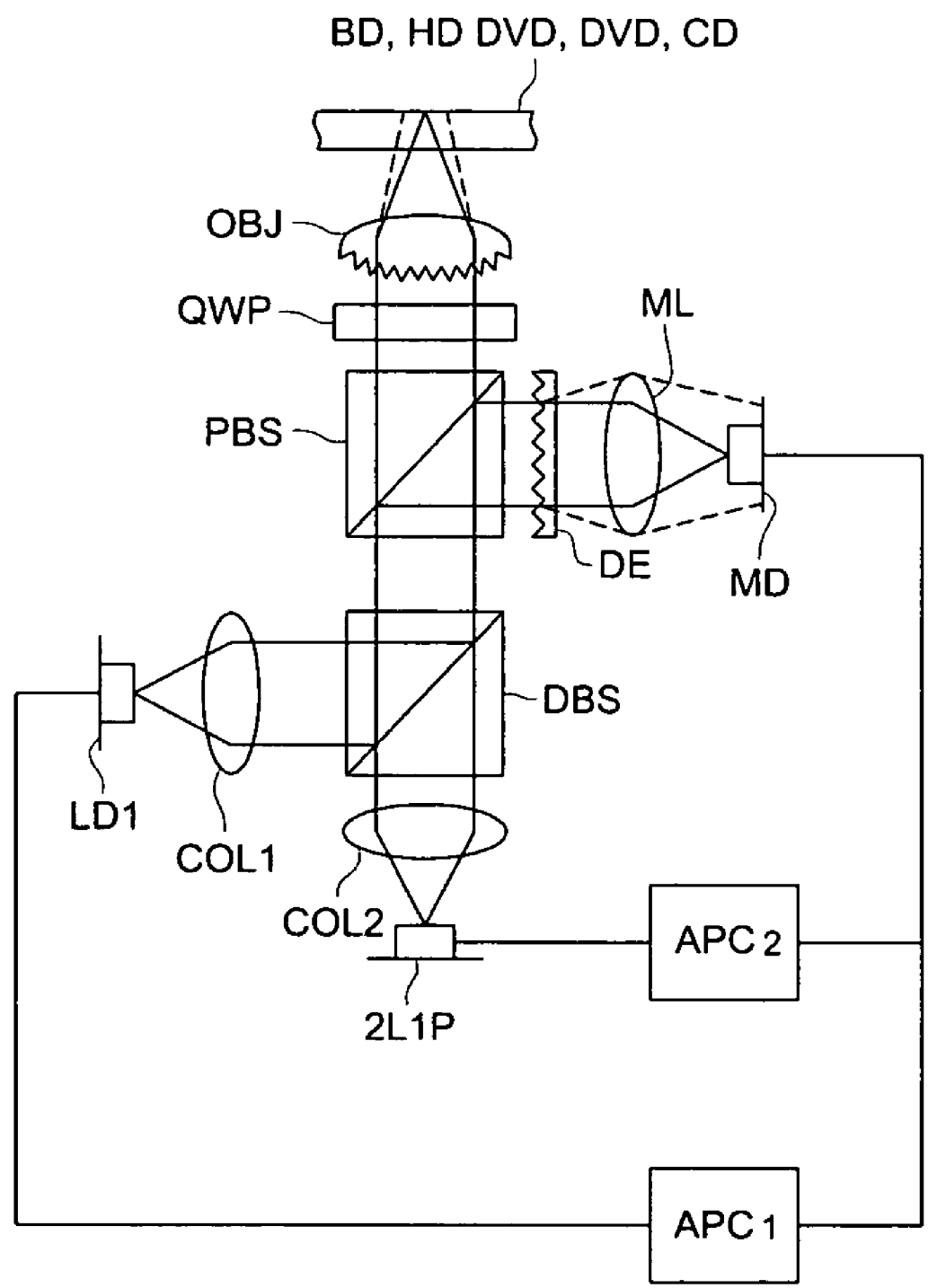
FIG. 3 is an outline configuration diagram of an optical pickup apparatus according to the present preferred embodiment.

In the following, a preferred embodiment of the present invention is explained in detail referring to the drawings. FIG. 3 is an outline configuration diagram of an optical pickup apparatus according to the present preferred embodiment. As is shown in the figure, an optical pickup apparatus PU that can carry out recording/reproduction of information appropriately in optical information recording media with different thicknesses of the protective substrate such as BD or HD DVD, DVD, and CD, is provided with a 2-laser 1-package 2L1P in which are mounted a first semiconductor laser LD1 that can emit a light flux with wavelength λH, a second semiconductor laser that can emit a light flux with wavelength λD, and a third semiconductor laser that can emit a light flux with wavelength λC, collimator lenses COL1 and COL2, a dichroic prism DBS, a polarized light flux splitter PBS which is the light flux splitting element, a diffraction element DE (called the second diffraction element) that has a diffraction structure formed on a flat plate, a monitor lens ML, a monitor detector MD that is the monitoring element, a quarter (λ/4) wavelength plate QWP, and an objective lens OBJ that is held so that it can be moved by an actuator. In the optical surface of the objective lens OBJ is formed a diffraction structure for providing compatibility with different types of optical disks such as CD, DVD, HD DVD, BD, etc. Further, the wavelength λH used in the present preferred embodiment is 350 to 450 nm, the wavelength λD is 600 to 700 nm, and the wavelength λC is 700 to 800 nm.

Figure 4:
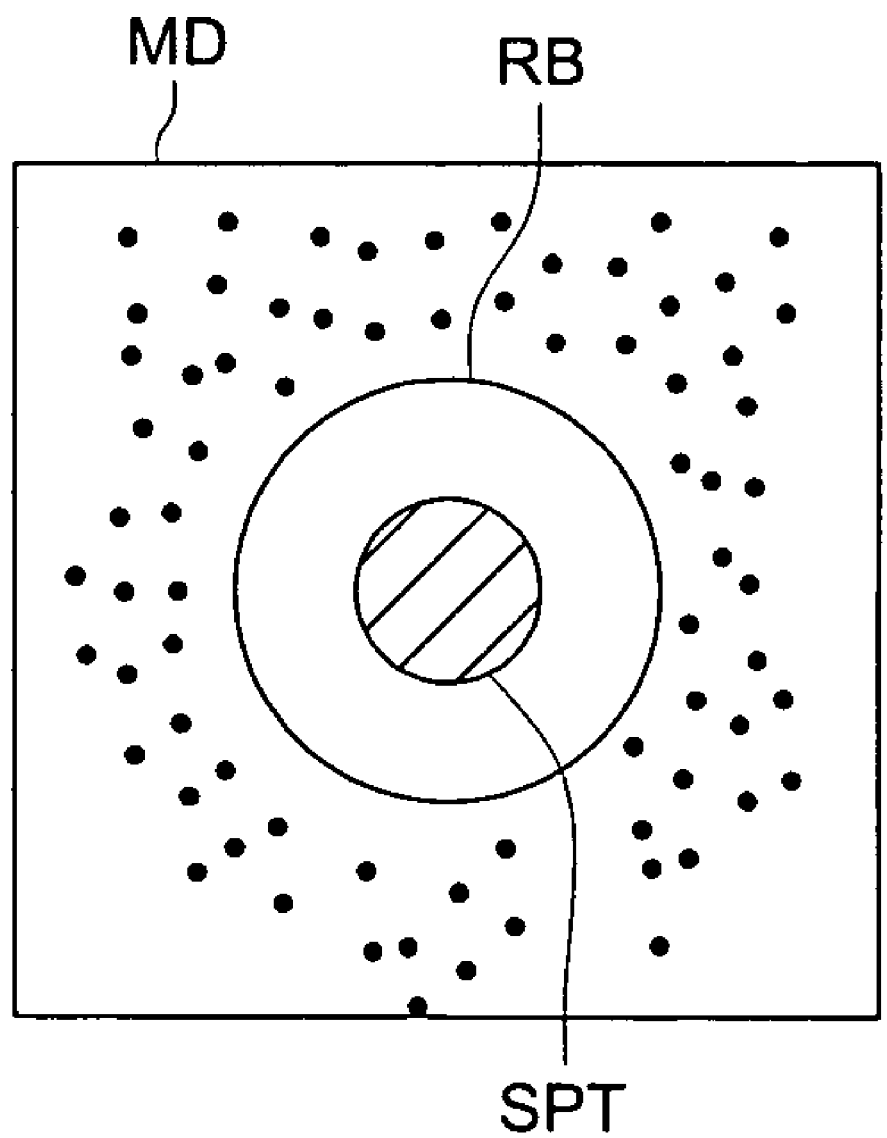
FIG. 4 is a diagram showing the light receiving section RB of the monitor detector MD as viewed from the direction of the optical axis.
Figure 5:
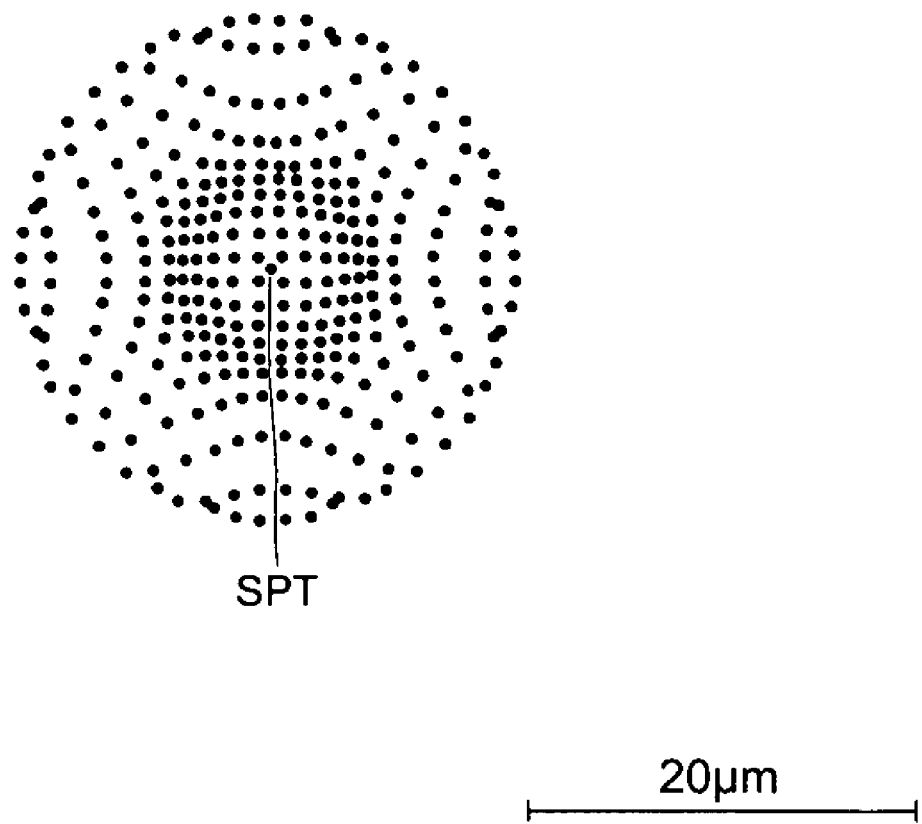
FIG. 5 is a simulation diagram showing the state of the spot of light converged on the recording surface of an optical disk and the flare.
Figure 6:
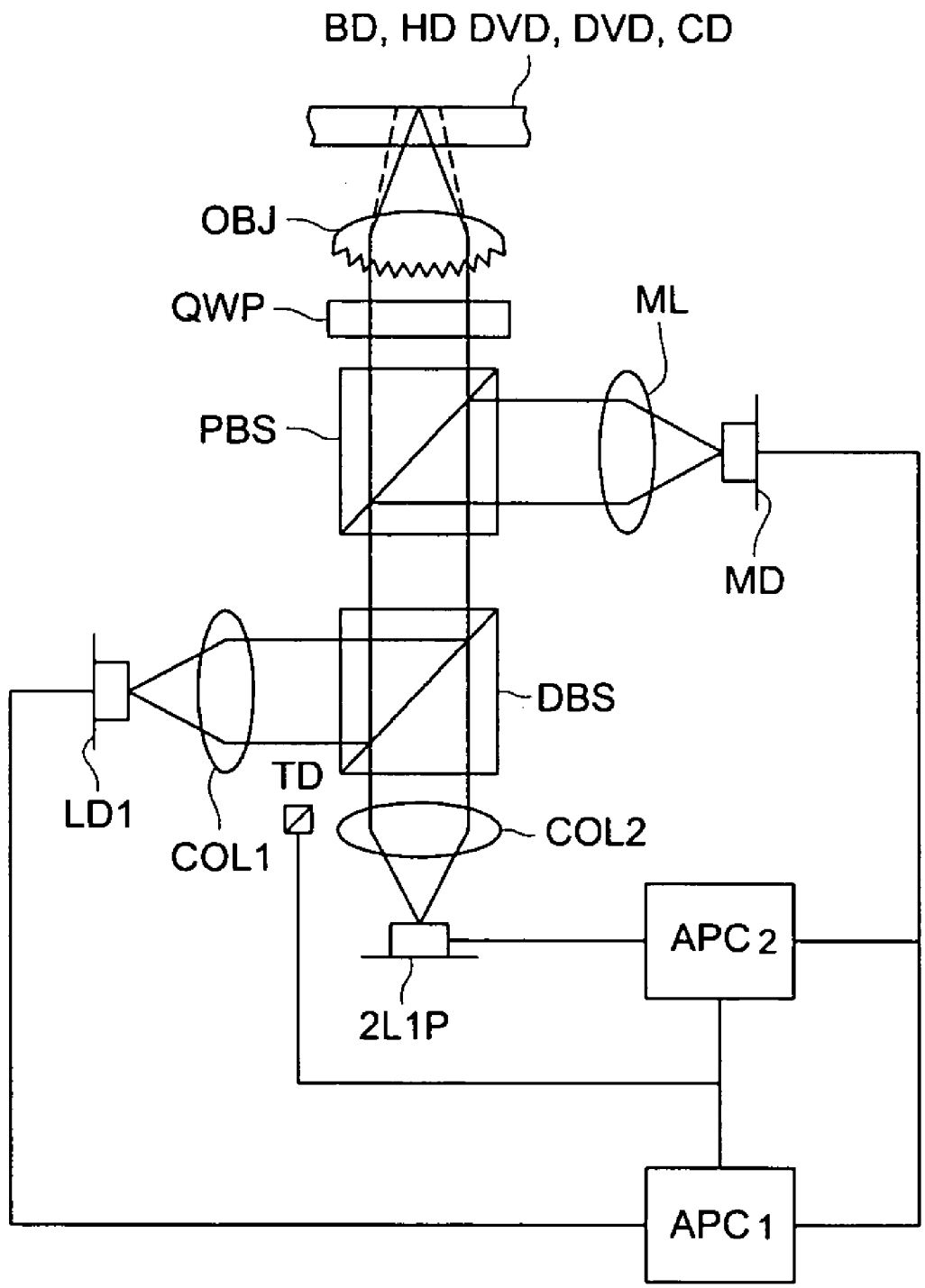
FIG. 6 is a diagram showing an example of an optical pickup apparatus.

FIG. 4 is a diagram showing the light receiving section RB of the monitor detector MD as viewed from the direction of the optical axis. In FIG. 4, the light receiving section RB is circular with a diameter of about 200 μm, and the light flux that has become flare after passing through the diffraction element DE arrived on the outside of the light receiving section RB. The monitor detector MD converts to a signal according to the light flux received by the light detecting section RB, and outputs this to the first auto power control APC1 and the second auto power control APC2 which constitute the control section. Based on this signal, the first auto power control APC1 controls the drive for the output of the first semiconductor laser LD1, and the second auto power control APC2 controls the drive for the outputs of the second semiconductor laser or of the third semiconductor laser in the 2-laser 1-package 2L1P.

In FIG. 3, when carrying out recording and/or reproduction of information in BD or HD DVD, the light flux with a wavelength of 350 to 450 nm emitted by the first semiconductor laser LD1 (the first light source) passes through the collimator COL1, is reflected by the dichroic prism DBS, a part of it passes through the polarized light flux splitter PBS, after passing through the quarter (λ/4) wavelength plate QWP, is incident on the objective lens OBJ in the state of an infinitely parallel light flux or in the state of a finite divergent light flux, and from there it is converged on to the information recording surface of a BD or an HD DVD (thickness of protective substrate is 0.1 mm or 0.6 mm).

The reflected light flux modulated by an information pit in the information recording surface passes again through the objective lens OBJ, passes through the quarter (λ/4) wavelength plate QWP, and is converged on the light receiving surface of a photo-detector not shown in the figure. The read out signal of the information recorded in the BD or the HD DVD is obtained using the output signal of this photo-detector.

Further, focus detection and track detection are made by detecting the changes in the shape and position of the spot in the photo-detector. The adjustment operations of the focusing actuator of the objective lens OBJ and of the tracking actuator are made based on this detection.

On the other hand, the remaining part of the light flux emitted from the first semiconductor laser LD1 is reflected by the polarizing flux splitter PBS, passes through the diffraction element DE and the monitor lens ML, and is received by the light receiving section RB of the monitor detector MD. When there is a change in the environmental temperature or a change in the oscillation wavelength of the light source, the first auto power control APC1 can increase or decrease the output of the first semiconductor laser LD1 in accordance with the amount of light of the light flux received by the light receiving section RB.

Here, the diffraction efficiency of the diffraction element DE is the ratio of the energy of the light flux incident on the receiving section RB of the monitor detector MD to the energy of the light flux incident on the diffraction element DE. Therefore, even the current converted by photo-electric conversion by the monitor detector MD changes, and because the first auto power control APC1 operates so as to maintain this current at a constant level, the amount of light emitted by the first semiconductor laser changes so as to compensate for this change. As a result, regarding the amount of light of the light flux converged by the objective lens OBJ, the first semiconductor laser LD1 carries out light emitting operation so as to compensate for the changes in the light flux converged on the information recording surface of the BD or HD DVD.

Figure 1:
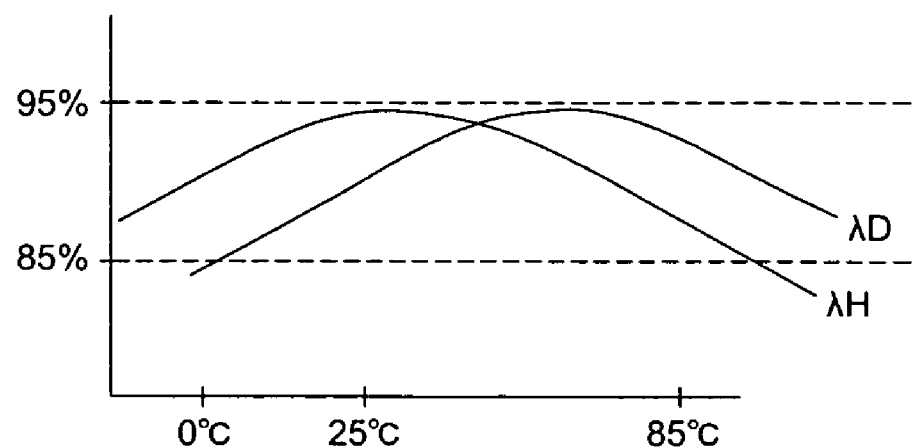
FIG 1(a) is a diagram showing an example of the relationship between the environmental temperature and the diffraction efficiency.
FIG. 1(b) is a diagram showing an example of the relationship between the wavelength fluctuations and the diffraction efficiency.
Figure 1:
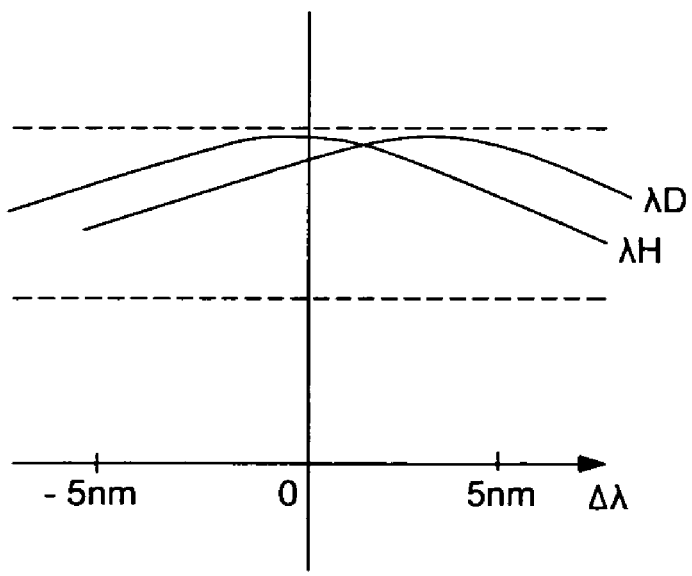
Figure 2:
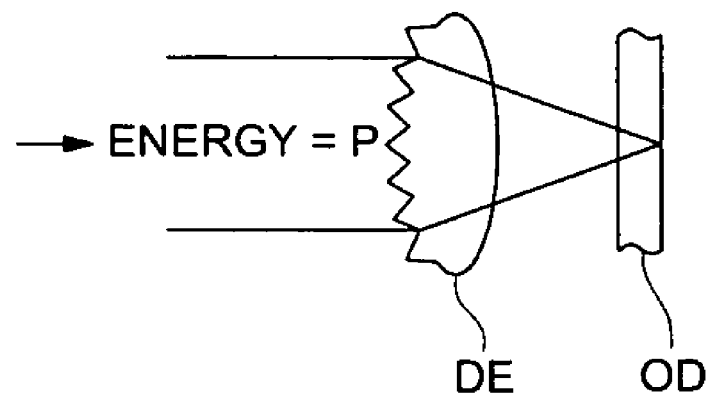
FIG. 2(a) is a drawing showing the light flux converged on the information recording surface of the optical disk OD by the diffraction element DE as viewed in a direction at right angles to the optical axis.
FIG. 2(b) is a diagram showing the light flux converged on the information recording surface of the optical disk OD as viewed in a direction at right angles to the optical axis.
Figure 2:
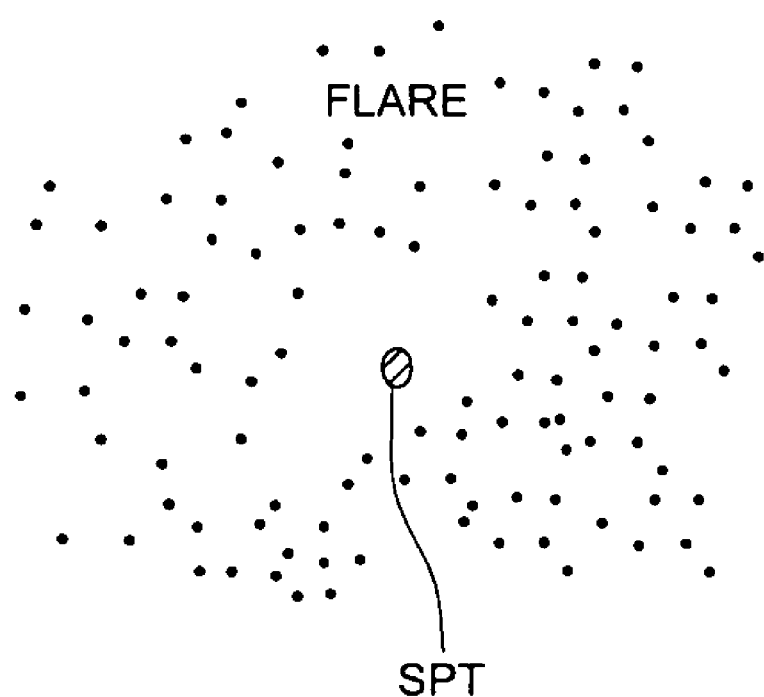

For example, consider that the environmental temperature rises, the temperature of the diffraction structure provided on the optical surface of the objective lens OBJ rises, and the diffraction efficiency decreases in accordance with the characteristics shown in FIG. 1(a). At this time, even the diffraction efficiency of the diffraction structure provided in the diffraction element DE also decreases in a similar manner. In other words, the amount of light of the light flux impinging on the light receiving section of the monitor light receiving element decreases. As a result of this, the first auto power control APC1 increases the drive current of the first semiconductor laser LD1. Thereafter, the amount of light of the light flux converged by the objective lens OBJ onto the information recording surface of the BD or HD DVD increases so as to compensate for the amount that would have decreased.

Further, although in this example it is desirable to completely compensate for the decreased amount of light in the converged light spot on the information recording surface of the BD or HD DVD due to reduction in the diffraction efficiency of the objective lens OBJ by the decrease in the diffraction efficiency due to the diffraction element DE, at least for the reduction in the amount of light on the information recording surface of the BD or HD DVD, if the diffraction efficiency of the diffraction element DE decreases so that the first auto power control APC1 operates so as to increase the amount of light emitted by the first semiconductor laser LD1, it is possible to increase the stability of operation of recording or reproduction for the information recording surface of the BD or HD DVD.

For example, in the case of an objective lens OBJ that forms a converged light spot using the 10th ordered diffracted light in case of a light flux with blue-violet color, the 6th ordered diffracted light in case of a light flux with red color, and the 5th ordered diffracted light in case of a near infrared light flux, since the reduction in the diffraction efficiency is on the ordered of about 10% due to an increase of only 60° C. in the temperature, if the increase in the light emission energy is 5 to 15% due to a decrease in the diffraction efficiency of the diffraction element DE, effectively, the change in the energy of the converged light on the information recording surface will be restricted to within 5%, and as long as it is an ordinarily imaginable temperature change, the change in the light converged on the information recording surface will be suppressed to a good level that does not affect recording and reproduction.

In FIG. 3, when carrying out recording and/or reproduction of information to or from a DVD, the light flux emitted from the second semiconductor laser (the second light source) with a light source wavelength of 600 to 700 nm is emitted from the 2-laser 1-package 2L1P, passes through the collimator lens COL2, passes through the dichroic prism DBS, a part of the light passes through the polarizing flux splitter PBS, after passing through the quarter ($\lambda$/4) wavelength plate QWP, is incident on the objective lens OBJ in the state of a finite divergent light flux, and from there it is focused on to the information recording surface of a DVD (thickness of protective substrate is 0.6 mm).

The reflected light flux modulated by an information pit in the information recording surface passes again through the objective lens OBJ, passes through the quarter ($\lambda$/4) wavelength plate QWP, and is converged on the light receiving surface of a photo-detector not shown in the figure. The read out signal of the information recorded in the DVD is obtained using the output signal of this photo-detector.

Further, focus detection and track detection are made by detecting the changes in the shape and position of the spot in the photo-detector. The adjustment operations of the focusing actuator of the objective lens OBJ and of the tracking actuator are made based on this detection.

On the other hand, the remaining part of the light flux emitted from the second semiconductor laser is reflected by the polarizing flux splitter PBS, passes through the diffraction element DE and the monitor lens ML, and is received by the light receiving section RB of the monitor detector MD. When there is a change in the environmental temperature or a change in the oscillation wavelength of the light source, the second auto power control APC2 can increase or decrease the output of the second semiconductor laser, in a manner similar to the control of the first semiconductor laser LD1 described above, in accordance with the amount of light of the light flux received by the light receiving section RB.

In FIG. 3, when carrying out recording and/or reproduction of information to or from a CD, the light flux emitted from the third semiconductor laser (the third light source) with a light source wavelength of 700 to 800 nm is emitted from the 2-laser 1-package 2L1P, passes through the collimator lens COL2, passes through the dichroic prism DBS, a part of the light passes through the polarizing flux splitter PBS, after passing through the quarter ($\lambda$/4) wavelength plate QWP, is incident on the objective lens OBJ in the state of a finite divergent light flux, and from there it is focused on to the information recording surface of a CD (thickness of protective substrate is 1.2 mm).

The reflected light flux modulated by an information pit in the information recording surface passes again through the objective lens OBJ, passes through the quarter ($\lambda$/4) wavelength plate QWP, and is focused on the light receiving surface of a photo-detector not shown in the figure. The read out signal of the information recorded in the CD is obtained using the output signal of this photo-detector.

Further, focus detection and track detection are made by detecting the changes in the shape and position of the spot in the photo-detector. The adjustment operations of the focusing actuator of the objective lens OBJ and of the tracking actuator are made based on this detection.

On the other hand, the remaining part of the light flux emitted from the third semiconductor laser is reflected by the polarizing flux splitter PBS, passes through the diffraction element DE and the monitor lens ML, and is received by the light receiving section RB of the monitor detector MD. When there is a change in the environmental temperature or a change in the oscillation wavelength of the light source, the second auto power control APC2 can increase or decrease the output of the third semiconductor laser, in a manner similar to the control of the first semiconductor laser LD1 described above, in accordance with the amount of light of the light flux received by the light receiving section RB.

In the above, although the present invention has been explained referring to a preferred embodiment, the present invention shall not be construed to be limited to the above preferred embodiment, and, of course, appropriate modifications and improvements are possible. The first diffraction element need not be an objective lens, but instead can be a device such as the collimator lens, coupling lens, parallel plate, etc., on which a diffraction structure had been formed, and also, the second diffraction element can be a monitor lens on which a diffraction structure has been formed.

What is claimed is:

1. An optical pickup apparatus, comprising:
   a first light source to emit a light flux with a first wavelength $\lambda H$;
   a light converging system including an objective lens to converge the light flux emitted from said first light source onto an information recording surface of an optical information recording medium through a protective substrate of the optical information recording medium, wherein a thickness of the protective substrate is t1;
   a first diffraction element placed within an optical path from said first light source up to the optical information recording medium;
   a light flux splitting element that is placed within the optical path from said first light source up to the optical information recording medium and that splits an incident light flux emitted by the first light source;
   a monitor element that receives a light flux that is split by said light flux splitting element and outputs a signal according to a received light amount;
   a second diffraction element placed between said light flux splitting element and said monitor element; and
   a control section that controls the drive of said first light source according to the signal from said monitor element;
   wherein a diffraction structure of said first diffraction element and a diffraction structure of said second diffraction element are formed in such a manner that, when a fluctuation occurs in the wavelength of the light flux emitted from said first light source, if a diffraction efficiency of the light flux passing through the diffraction structure of said first diffraction element increases, the diffraction efficiency of the light flux passing through the diffraction structure of said second diffraction element increases, and if the diffraction efficiency of the light flux passing through the diffraction structure of said first diffraction element decreases, the diffraction efficiency of the light flux passing through the diffraction structure of said second diffraction element decreases.

2. The optical pickup apparatus according to claim 1, wherein a diffraction structure of said first diffraction element and a diffraction structure of said second diffraction element are formed in such a manner that, when the environmental temperature change, if the diffraction efficiency of the light flux passing through the diffraction structure of said first diffraction element increases, the diffraction efficiency of the light flux passing through the diffraction structure of said second diffraction element increases, and if the diffraction efficiency of the light flux passing through the diffraction structure of said first diffraction element decreases, the diffraction efficiency of the light flux passing through the diffraction structure of said second diffraction element decreases.

3. The optical pickup apparatus according to claims 1, wherein each step difference in a direction of an optical axis of a diffraction structure of said first diffraction element is almost equal to each step difference in a direction of an optical axis of a diffraction structure of said second diffraction element.

4. The optical pickup apparatus according to claim 1, wherein a diffraction structure of said first diffraction element comprises a plurality of ring-shaped zone steps and a diffraction structure of said second diffraction element comprise a plurality of ring-shaped zone steps, and wherein said first diffraction element and said second diffraction element are structured to satisfy the following equation when the light flux from said first light source passes through the diffraction structure of said first diffraction element and the diffraction structure of said second diffraction element:

$$MOD(d1 \times (n1-1)/\lambda H) = MOD(d2 \times (n2-1)/\lambda H) \quad (1)$$

where, d1 is the step difference of the ring-shaped zone closest to an optical axis in the diffraction structure of said first diffraction element,
d2 is step difference of the ring-shaped zone closest to an optical axis in the diffraction structure of said second diffraction element,
n1 is a refractive index of said first diffraction element for the light flux with wavelength $\lambda H$,
n2 is a refractive index of said second diffraction element for the light flux with wavelength $\lambda H$, and
MOD ($\alpha$) is an integer closest to $\alpha$.

5. The optical pickup apparatus according to claim 1, wherein a diffraction structure of said first diffraction element comprises a plurality of ring-shaped zone steps and a diffraction structure of said second diffraction element comprise a plurality of ring-shaped zone steps, and wherein said first diffraction element and said second diffraction element are structured to satisfy the following equation when the light flux from said first light source passes through the diffraction structure of said first diffraction element and the diffraction structure of said second diffraction element:

$$MOD(dm1 \times (n1-1)/\lambda H) = MOD(dm2 \times (n2-1)/\lambda H) \quad (2)$$

where, dm1 is an average step difference of the ring-shaped zone steps of said first diffraction element within an effective radius of the diffraction structure of said first diffraction element,
dm2 is an average step difference of ring-shaped zone steps of said second diffraction element within an effective radius of the diffraction structure of said second diffraction element,
n1 is the refractive index of said first diffraction element for the light flux with wavelength $\lambda H$,
n2 is the refractive index of said second diffraction element for the light flux with wavelength $\lambda H$, and
MOD ($\alpha$) is an integer closest to $\alpha$.

6. The optical pickup apparatus according to claim 1, wherein said first diffraction element and said second diffraction element are made of plastic.

7. The optical pickup apparatus according to claim 1, wherein said first diffraction element is said objective lens.

8. The optical pickup apparatus according to claim 1, wherein said first diffraction element is a collimator lens.

9. The optical pickup apparatus according to claim 1, wherein said first diffraction element is a color aberration compensating element.

10. The optical pickup apparatus according to claim 1, wherein said first diffraction element and said second diffraction element are the same.

11. The optical pickup apparatus according to claim 1, wherein a light receiving section of said monitor element receives a part, including the optical axis, of the light incident on said monitor element.

12. An optical pickup apparatus, comprising:
    a first light source to emit a light flux with a first wavelength $\lambda H$;
    a second light source to emit a light flux with a second wavelength $\lambda D$;

a light converging system including an objective lens to converge the light flux emitted from said first light source through a protective substrate having a thickness of t1 onto an information recording surface of a first optical information recording medium, and to converge the light flux emitted from said second light source through a protective substrate having a thickness of t2 (t1<t2)onto an information recording surface of a second optical information recording medium;

a first diffraction element placed within an optical path from at least one of said first light source and said second light source to one of the first optical information recording medium and the second optical information recording medium;

an light flux splitting element that is placed within the optical path from said first light source up to said optical information recording medium and that splits the incident light flux;

a monitor element that receives the light flux that is split by said light flux splitting element and outputs a signal according to the received light amount;

a second diffraction element placed between said light flux splitting element and said monitor element; and a control section that controls the drive of said first light source according to the signal from said monitor element.

13. The optical pickup apparatus according to claim 12, wherein a diffraction structure of said first diffraction element comprises a plurality of ring-shaped zone steps and a diffraction structure of said second diffraction element comprise a plurality of ring-shaped zone steps, and wherein said first diffraction element and said second diffraction element structured to satisfy the following equation when the light flux from said second light source passes through the diffraction structure of said first diffraction element and the diffraction structure of said second diffraction element:

$$MOD(d1'\times(n1'-1)/\lambda H)=MOD(d2'\times(n2'-1)/\lambda H) \quad (1)$$

where, d1' is the step difference of the ring-shaped zone closest to an optical axis in the diffraction structure of said first diffraction element, d2' is step difference of the ring-shaped zone closest to an optical axis in the diffraction structure of said second diffraction element, n1' is a refractive index of said first diffraction element for the light flux with wavelength $\lambda H$, n2' is a refractive index of said second diffraction element for the light flux with wavelength $\lambda H$, and MOD ($\alpha$) is an integer closest to $\alpha$.

14. The optical pickup apparatus according to claim 12, wherein a diffraction structure of said first diffraction element comprises a plurality of ring-shaped zone steps and a diffraction structure of said second diffraction element comprise a plurality of ring-shaped zone steps, and wherein said first diffraction element and said second diffraction element are structure to satisfy the following equation when the light flux from said second light source passes through the diffraction structure of said first diffraction element and the diffraction structure of said second diffraction element:

$$MOD(dm1'\times(n1'-1)/\lambda H)=MOD(dm2'\times(n2'-1)/\lambda H) \quad (2)$$

where, dm1' is an average step difference of the ring-shaped zone steps of said first diffraction element within an effective radius of the diffraction structure of said first diffraction element, dm2' is an average step difference of ring-shaped zone steps of said second diffraction element within an effective radius of the diffraction structure of said second diffraction element, n1' is the refractive index of said first diffraction element for the light flux with wavelength $\lambda H$, n2' is the refractive index of said second diffraction element for the light flux with wavelength $\lambda H$, and MOD ($\alpha$) is an integer closest to $\alpha$.

15. The optical pickup apparatus according to claim 12, wherein a diffraction structure of said first diffraction element comprises a plurality of ring-shaped zone steps and a diffraction structure of said second diffraction element comprise a plurality of ring-shaped zone steps, and wherein said first diffraction element and said second diffraction element are structured to satisfy the following equation when the light flux from said first light source and the light flux from said second light source pass through said first diffraction structure and said second diffraction structure:

$$MOD(dmm1\times(n1-1)/\lambda H)=MOD(dmm2\times(n2-1)/\lambda H) \quad (5)$$

where, dmm1 is an average step difference of ring-shaped zone steps of said first diffraction element within an area in which the light flux with wavelength $\lambda H$ of said first light source and the light flux with wavelength $\lambda D$ of said second light source pass through commonly, dmm2 is an average step difference of ring-shaped zone steps of said second diffraction element within an effective radius of the diffraction structure of said second diffraction element, n1 is a refractive index of said first diffraction element for the light flux with wavelength $\lambda H$, n2 is a refractive index of said second diffraction element for the light flux with wavelength $\lambda H$, and MOD ($\alpha$) is an integer closest to $\alpha$.

16. The optical pickup apparatus according to claim 12, wherein said second diffraction element is a monitor lens.

17. The optical pickup apparatus according to claim 12, further comprising; a third light source to irradiate an information recording surface of a third optical information recording medium in which the thickness of a protective substrate is t3 (t2<t3) with a light flux with a third wavelength $\lambda C$ ($\lambda D<\lambda C$), wherein light fluxes of wavelengths $\lambda H$, $\lambda D$, and $\lambda C$ pass through said first diffraction element.

18. The optical pickup apparatus according to claim 17, wherein a finite light flux is incident upon said first optical element.

19. The optical pickup apparatus according to claim 17, wherein a diffraction structure of said first diffraction element comprises a plurality of ring-shaped zone steps and a diffraction structure of said second diffraction element comprise a plurality of ring-shaped zone steps, and wherein said first diffraction element and said second diffraction element are structured to satisfy the following equation:

$$MOD(dmm1\times(n1-1)/\lambda H)=MOD(dmm2'\times(n2-1)/\lambda H) \quad (6)$$

where, dmm1' is an average step difference of ring-shaped zone steps of said first diffraction element within an area in which the light flux with wavelength $\lambda H$ of said first light source, the light flux with wavelength $\lambda D$ of said second light source and the light flux with wavelength $\lambda C$ pass through commonly, dmm2 is an average step difference of ring-shaped zone steps of said second diffraction element within an effective radius of the diffraction structure of said second diffraction element, n1 is a refractive index of said first diffraction element for the light flux with wavelength λH, n2 is a refractive index of said second diffraction element for the light flux with wavelength λH, and MOD (α) is an integer closest to α.

20. The optical pickup apparatus according to claim 19, wherein said first diffraction element and said second diffraction element are structured to satisfy the following equation:

$$MOD(dmm1' \times (n-1)/\lambda H) = 6 \qquad (7)$$

21. The optical pickup apparatus according to claim 19, wherein said first diffraction element and said second diffraction element are structured to satisfy the following equation:

$$MOD(dmm1' \times (n1-1)/\lambda H) = 10 \qquad (8)$$

22. The optical pickup apparatus according to claim 17, wherein the first wavelength λH is 350 to 450 nm, the second wavelength λD is 600 to 700 nm, and the third wavelength λC is 700 to 800 nm.

* * * * *